United States Patent Office 3,074,931
Patented Jan. 22, 1963

3,074,931
DIBENZAZEPINES, PROCESS FOR THEIR PREPARATION AND N-ALKYLATED DERIVATIVES THEREOF
Paul N. Craig, Roslyn, Pa., assignor, by mesne assignments, to Smith Kline & French Laboratories, Philadelphia, Pa., a corporation of Pennsylvania
No Drawing. Filed Oct. 7, 1957, Ser. No. 688,442
8 Claims. (Cl. 260—239)

This invention relates to 5H-dibenz-[b,f]-azepines and 5-dialkylaminoalkyl-5H-dibenz-[b,f]-azepines, and the novel processes for their preparation.

The 5 - dialkylaminoalkyl - 5H - dibenz - [b,f]-azepines which are the subject of this invention have useful therapeutic activity, specifically as general central nervous system depressants and particularly as antiemetics, tranquilizers, calmatives, antihistaminics, spasmolytics, antishock agents and potentiators of analgetics or anesthetics.

The novel 5-dialkylaminoalkyl-5H-dibenz[b,f]-azepines of this invention are represented by the general formula:

Formula 1

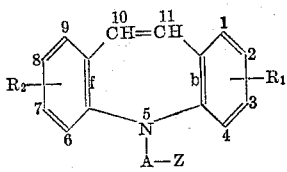

when:
$R_1$ and $R_2$ represent hydrogen, halogen, trifluoromethyl, alkyl or alkoxyl,
A represents a divalent, straight or branched lower alkylene chain, preferably containing 2 to 6 carbon atoms, separating the two nitrogens by at least 2 carbons, and
Z represents amino, monoalkylamino, dialkylamino, pyrrolidinyl, N-hydrogenpiperazinyl, N-alkylpiperazinyl, N-hydroxyalkylenepiperazinyl, N-alkanoyloxyalkylenepiperazinyl, N-benzoyloxyalkylenepiperazinyl, N-dialkylaminoalkylenepiperazinyl, N-hydroxyalkyleneoxyalkylenepiperazinyl, N - alkanoyloxyalkyleneoxyalkylenepiperazinyl, N-benzoyloxyalkyleneoxyalkylenepiperazinyl or N-phenylalkylpiperazinyl.

The advantageous compounds of this invention are represented by the following formula:

Formula 2

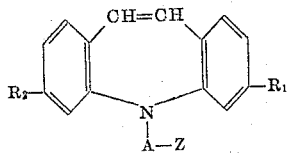

when:
$R_1$ and $R_2$ represent hydrogen, halogen of atomic weight less than 80, trifluoromethyl, alkyl or alkoxyl,
A represents a divalent, straight or branched lower alkylene chain, preferably containing 2 to 6 carbon atoms, separating the two nitrogens by at least 2 carbons, and
Z represents amino, methylamino, ethylamino, dimethylamino, diethylamino, pyrrolidinyl, N-alkylpiperazinyl, N-hydroxyalkylenepiperazinyl, N-alkanoyloxyalkylenepiperazinyl, N-hydroxyalkyleneoxyalkylenepiperazinyl and N-alkanoyloxyalkyleneoxyalkylenepiperazinyl.

Preferred compounds of this invention are represented by the following formula:

Formula 3

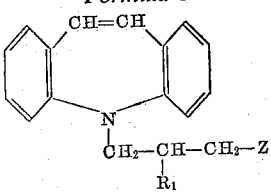

when:
$R_1$ represents hydrogen or methyl, and
Z represents amino, methylamino, ethylamino, dimethylamino, diethylamino, pyrrolidinyl, N-alkylpiperazinyl, N-hydroxyalkylenepiperazinyl, N-alkanoyloxyalkylenepiperazinyl, N-hydroxyalkyleneoxyalkylenepiperazinyl and N-alkanoyloxyalkyleneoxyalkylenepiperazinyl.

By the terms alkyl, alkoxyl or alkanol where used herein alone or in combination with other terms, aliphatic groups having from 1 to 6 carbon atoms and preferably from 1 to 4 carbon atoms are indicated. When the term alkylene is used in connection with a carmbon chain, except where otherwise specified represents alkylene chains of from 2 to 6 carbon atoms, preferably 2 to 4 carbons. The term alkylene further indicates that a chain of at least 2 carbon atoms separate the oxygen or nitrogen atoms to which the alkylene chain is attached. The term dialkylamino when used in reference to the generic name represented in Formula 1 includes various heterocyclic amines attached to the alkylene side chain at the 5-position as outlined here above.

This invention also includes salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The starting materials for preparing the 5-dialkylaminoalkyl-dibenzazepines are novel compounds of the following structural formula:

Formula 4

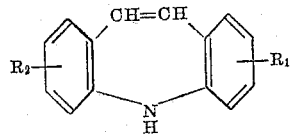

when:
$R_1$ and $R_2$ represent hydrogen, halogen of atomic weight less than 80, trifluoromethyl, alkyl or alkoxyl, preferably in the 3,7-positions, respectively.

The novel dibenzazepines of Formula 4 which are unsubstituted in the 5-position are prepared from the corresponding iminodibenzyls by dehydrogenation in accordance with the novel method of this invention. In this method, the iminodibenzyl is heated in the presence of a dehydrogenation catalyst. Exemplary of suitable catalysts are sulfur, selenium or, advantageously, the noble metals, such as palladium, ruthenium, iridium, rhodium and osmium which are preferably used in combination with a carrier such as charcoal, barium sulfate or silica gel. The metal content of the noble metal catalyst when preferably combined with a carrier will be from about 5 to about 50% by weight. The catalyst of choice is palladium on charcoal.

This method can be carried out in a variety of ways, for example, the iminodibenzyl can be passed in the vapor phase through a glass column packed with the dehydrogenation catalyst. Such passage can be effected by distilling in the case of a liquid or by sublimation in the case of a solid. It is desirable for improving the contact properties of the catalyst to have said dehydrogenation catalyst loosely distributed on an inert dispersing medium, for example, sprinkled on glass wool. It is preferred to carry out the vaporization of the iminodibenzyl under reduced pressure. The product is isolated by cooling the upper end of the column and removing the material which collects. The solid is purified by recrystallization or chromatography with activated alumina to give the dibenzazepine.

Alternatively, the reaction may be run in a flask by heating the iminodibenzyl either alone or in a solvent such as diphenyl, diphenyloxide or dimethylaniline at elevated temperatures, preferably about 175° C. to about 300° C. with a catalyst as outlined above such as selenium, sulfur or palladium. The reaction product is then isolated by fractional crystallization or chromatography.

The 5-unsubstituted iminodibenzyls, used as intermediates as outlined above, are readily obtained from the properly substituted diaminodibenzyl:

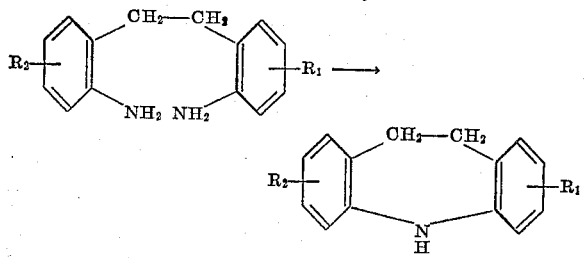

This method is carried out by heating the diphosphate of the substituted 2,2'-diaminodibenzyl, alone or in the presence of polyphosphoric acid, at approximately 280° C. for a short period of time, for example from 30 to 60 minutes.

The diaminodibenzyls are prepared by methods analogous to those in the prior art which are generalized in the following synthetic procedure:

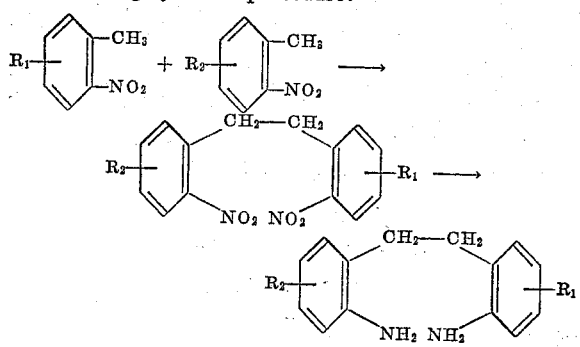

The substituted 2-nitrotoluenes are oxidized with, for example, an alkyl nitrite in the presence of an alkali alkoxide such as sodium ethoxide to give the 2,2'-dinitrodibenzyl. The nitro groups are reduced catalytically with, for example, Raney nickel to give the diaminodibenzyl which is then reacted further as described above.

The 5-unsubstituted dibenzazepines have specific utility as intermediates for the preparation of the therapeutically valuable 5-dialkylaminoalkyl-5H - dibenz - [b,f] - azepines represented by Formulas 1 and 4:

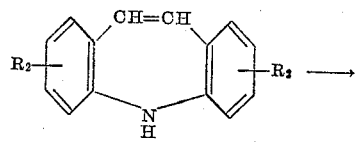

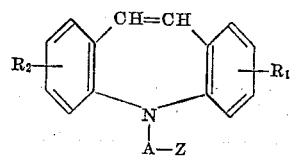

Thus, the dibenzazepines are alkylated with any reactive dialkylaminoalkyl ester containing the desired —A—Z moiety such as a halide, preferably chloride or bromide, or an aryl sulfonate, preferably n-toluene sulfonate. The reaction is carried out advantageously by refluxing the reactants in a suitable inert aromatic solvent such as, preferably, benzene, toluene or xylene, in which at least one of the reactants must be soluble. A suitable acid-binding agent is usually included, such as an alkali metal amide, preferably sodium, potassium or lithium amide. Other suitable acid-binding agents are alkali metal hydrides, preferably sodium hydride or alkali metal aryl or alkyl compounds, preferably phenyl or octyl sodium. If an acid addition salt of the reactive dialkylaminoalkyl ester is used, a corresponding increase in the amount of acid-binding agent must be used.

The preferred method of alkylation, however, is to react the dibenzazepine with a slight excess of a dialkylaminoalkyl chloride or bromide in the presence of sodium or potassium amide in refluxing benzene or toluene for from 30 minutes to 36 hours, preferably 3 to 24 hours. The 5-dialkylaminoalkyl-dibenzazepine is isolated by cooling the reaction mixture and carefully adding an excess of water. The organic layers are extracted with dilute acid, preferably dilute hydrochloric acid. The acid extracts are combined, neutralized with dilute base and extracted with benzene. The dried benzene extracts are evaporated and the resulting residue is optionally fractionally distilled under high vacuum or purified by a chromatographic procedure to give the desired base. In practice, the basic oil is usually dissolved in an organic solvent and converted into a stable salt by reacting the solution with a suitable organic or inorganic acid.

The 5-(ω-piperazinylalkyl)-dibenzazepines are prepared advantageously by alkylating the dibenzazepine with an ω-haloalkylpiperazine having the free N-hydrogen of the piperazinyl moiety replaced by an easily removed moiety, for example, a benzyl, carbobenzoxy, or acyl, preferably formyl group. The N-protective group is then removed under mild conditions, such as by weakly alkaline hydrolysis in the case of the preferred formyl group. The resulting 5-(ω-piperazinylalkyl) - dibenzazepine is then further alkylated to form the various N-substituted piperazinyl compounds represented in Formula 1. Such methods of alkylation are by a reactive ester such as an alkyl halide in the presence of an acid-binding agent as described above in an inert solvent such as benzene or xylene or by reaction with an alkylene oxide such as ethylene oxide in a lower alcohol. In addition, 5-(N'-alkyl-N-piperazinylalkyl)-dibenzazepines having a terminal group on the N'-alkyl moiety capable of undergoing reaction, such as ω-hydroxyalkyl, are optionally reacted with an acyl halide in the presence of an acid-binding agent to give, for example, N'-acyloxyalkyl derivatives of 5-(ω-piperazinylalkyl)-dibenzazepines.

Another synthetic route to 5-(ω-piperazinylalkyl)-dibenzazepines is by means of 5-(ω-ester-alkyl)-dibenzazepines which have a reactive end group on the 5-alkyl chain, for example, an ω-tosylate or ω-chloro end group, which can be reacted with various amines to form primary, secondary or tertiary amines, for instance by refluxing the ester and amine in the presence of an acid binder for short periods.

The primary 5-(aminoalkyl)-dibenzazepines are alternatively produced by reacting the 5-unsubstituted dibenzazepines with an excess of acrylonitrile or in an inert solvent such as benzene in the presence of a catalytic amount of a strong base, such as a quaternary base, for instance benzyltrimethylammonium hydroxide. The resulting β-cyanoethyl compound is then reduced, for instance with lithium aluminum hydride to give the primary amine. Further alkylation by methods discussed hereinbefore of the primary amine gives other compounds of this invention.

The 5-dialkylaminoalkyl - 5H - dibenz-[b,f]-azepines of this invention may be advantageously prepared from substituted dibenzyls in an alternative manner, namely, by alkylating a 2-amino-2'-halodibenzyl under conditions identical with those described above for the 5-alkylation of the dibenzazepines and subsequently cyclizing the dibenzyl to form the alkylated iminodibenzyl which is in turn dehydrogenated under conditions described here above to give the desired compounds.

The above cyclization of a 2-dialkylaminoalkylamino-2'-halodibenzyl, with a dialkylaminoalkyl moiety which is inert under the conditions subsequently employed, is carried out by heating the compounds in the presence of an acid-binding agent, present in at least an amount sufficient to neutralize the hydrohalic acid formed during the reaction. Exemplary of such acid-binding agents are the carbonates, such as sodium carbonate, sodium bicarbonate or preferably potassium carbonate. The reaction is run in a suitable, nonreactive organic solvent in which the reactants are at least partially soluble. Exemplary are dioxane, dimethylaniline, diethylformamide, methylformamide, dimethylformamide or dimethylacetamide. Preferably, the solvent is dimethylformamide and other similar lower-carbon amides.

Optimum yields in this cyclization are obtained when catalytic amounts of copper or copper bronze powder are added, for instance up to 5% by weight of the dibenzyl. The reaction mixture is advantageously heated at from about 100 to 220° C. for long periods, such as from 4 to 60 hours. Preferably, the reaction mixture is heated with stirring at the boiling point of the solvent for from about 8 to 24 hours. The reaction mixture is worked up by cooling, filtering and quenching in water. The separated product is washed and purified to give the desired iminodibenzyl.

The foregoing is a general description of the preparation of 5H-dibenz-[b,f]-azepines by a novel dehydrogenation process and the main synthetic routes by which these compounds may be converted into 5-dialkylaminoalkyl-5H-dibenz-[b,f]-azepine derivatives.

Alternatively, a 5-unsubstituted iminodibenzyl may be alkylated as described above with a reactive dialkylaminoalkyl ester containing the desired —A—Z moiety of Formulas 1 and 4. The thus alkylated iminodibenzyl may be converted to the corresponding alkylated dibenzazepine by means of a dehydrogenation catalyst in accordance with the novel process described hereinbefore:

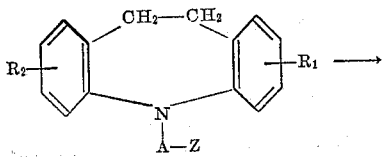

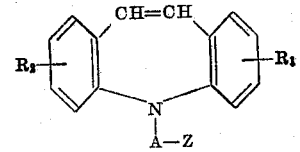

Of particular advantage as preparative procedures for obtaining the 5-dialkylaminoalkyl - 5H - dibenz-[b,f]-azepines are the N-alkylation of dibenzazepines in the 5-position of the nucleus by a reactive dialkylaminoalkyl ester, and the dehydrogenation of 5-alkylated iminodibenzyls by a suitable catalyst such as palladium on charcoal.

It will be readily apparent to one skilled in the art that certain of the compounds of this invention, notably those in which A is represented by an aliphatic carbon chain branched so that an asymmetric carbon atom is formed, may be present as optical isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization, for instance, of the $d$-tartrate salts of the 5-dialkylaminoalkylated dibenzazepine derivatives. Alternatively, a synthesis starting with an optically active side chain may yield the desired optical isomer.

The following examples are not limiting but are illustrative of compounds of this invention and the procedures for their preparation and will serve to make fully apparent all of the compounds embraced by the general formula given above and the preparation thereof respectively.

EXAMPLE 1

An electrically heated glass column, 35 mm. in diameter and 30 cm. long, is packed with 1.0 g. of 30% palladium on charcoal sprinkled on glass wool and 4.5 g. of 10,11 - dihydro - 5H - dibenz - [b,f] - azepine is sublimed through the column at 0.5 mm. by heating until sublimination occurs. The upper part of the column is surrounded by a Dry Ice bath and after two hours the reaction is completed. The yellow sublimate is removed and purified by chromatography through alumina, using benzene, to give the product, 5H-dibenz-[b,f]-azepine, M.P. 196.5 to 198° C.

EXAMPLE 2

To a mixture of 1.8 g. of sodium amide in 100 ml. of anhydrous toluene heated to reflux, is added 5.5 g. of 5H-dibenz-[b,f]-azepine (prepared as in Example 1) dissolved in 200 ml. of hot toluene. The resulting mixture is stirred and refluxed for two hours. A solution of 5.5 g. of 3-chloro-1-dimethylaminopropane in 50 ml. of toluene is then added and the refluxing continued for 17 hours, with stirring. The cooled reaction mixture is treated with 125 ml. of water, stirred for 20 minutes and the separated organic layer extracted several times with dilute hydrochloric acid. The combined acidic extracts are made basic with 40% sodium hydroxide solution and extracted with benzene. Evaporation of the solvent gives the residual oily product, 5-(3'-dimethylaminopropyl)-5H-dibenz-[b,f]-azepine, which may be purified by chromatography through alumina, using benzene as the solvent.

A solution of 6.0 g. of the pure free base in 40 ml. of ethyl acetate is treated with 2.6 g. of maleic acid dissolved in 50 ml. of hot ethyl acetate. On cooling, the solution gives yellow needles of 5-(3'-dimethylaminopropyl)-5H-dibenz-[b,f]-azepine maleate, M.P. 148 to 149.5° C.

EXAMPLE 3

A mixture of 3.9 g. of 5H-dibenz-[b,f]-azepine (prepared as in Example 1), 0.9 g. of sodium amide and 75 ml. of xylene is stirred and heated at reflux for one hour. A solution of 3.9 g. of 1-(3'-chloropropyl)-4-methylpiperazine in 25 ml. of xylene is added and the mixture is refluxed for six hours. The cooled reaction mixture is treated with water, extracted with dilute hydrochloric acid and the acid extracts are neutralized with aqueous ammonia. After benzene extraction and subsequent removal of the dried solvent in vacuo, the residue is purified by chromatography or molecular distillation at 190° C. and 15 microns to give 5-[3'-(4''-methyl-1''-piperazinyl)-propyl]-5H-dibenz-[b,f]-azepine.

A solution of the free base in ether is treated with ethereal hydrogen chloride to yield the dihydrochloride salt.

EXAMPLE 4

A solution of 41.0 g. of 2-nitro-4-trifluoromethyltoluene (prepared from 4-trifluoromethylbenzaldehyde by reduction with amalgamated zinc and concentrated hydrochloric acid according to the general directions outlined for the "Clemmenson Reduction" in Organic Reactions, vol. 1, Chap. 7, p. 155, Roger Adams, Ed., and subsequent nitration of the resulting 4-trifluoromethyltoluene by a standard procedure with a mixture of nitric and sulfuric acids) and 23.4 g. of amyl nitrite in 150 ml. of cyclohexane is added dropwise with stirring at 5° C. to a suspension of 13.6 g. of sodium ethoxide in 50 ml. of absolute ether. The mixture is stirred with cooling for six hours and for an additional four hours at room temperature. The reaction mixture is then treated with 200 ml. of water, filtered and the solid recrystallized from alcohol to yield 2,2'-dinitro-4,4'-bistrifluoromethyldibenzyl.

A solution of 40.8 g. of 2,2'-dinitro-4,4'-bistrifluoromethyldibenzyl in 200 ml. of dioxane is hydrogenated in the presence of 10.0 g. of Raney nickel at 40 to 50° C. and four atmospheres pressure until the theoretical six mole ratio of hydrogen is taken up. The mixture is then heated on a steam bath to about 90–95° C. and the catalyst removed by filtration. Evaporation of the solvent gives 2,2'-diamino-4,4'-bistrifluoromethyldibenzyl. For the ensuing reaction, it is not necessary to isolate the free diamino compound. Thus, 43.2 g. of phosphoric acid is added to the above hot, filtered dioxane solution and the precipitate, after cooling, is filtered and washed to give the diphosphate.

A mixture of 10.8 g. of 2,2'-diamino-4,4'-bistrifluoromethyldibenzyl diphosphate and 100 ml. of diphenyl ether is heated at 280° C. for 40 minutes. The reaction mixture is cooled and the separated solid washed with dilute hydrochloric acid and water to yield 3,7-bistrifluoromethyl-10,11-dihydro-5H-dibenz-[b,f]-azepine (3,7-bistrifluoromethyliminodibenzyl).

EXAMPLE 5

An electrically heated glass column is packed with 2.0 g. of 30% palladium on charcoal sprinkled on glass wool and 10.0 g. of 3,7 bistrifluoromethyliminodibenzyl (prepared as in Example 4) is sublimed through it by increased heating at 0.2 mm. until sublimation slowly occurs. After two hours the reaction is completed and the material which collected in the cooled upper part of the column is removed. The crude product is purified by chromatography through alumina using benzene and chloroform to yield 3,7-bistrifluoromethyl-5H-dibenz-[b,f]-azepine as orange-yellow crystals.

EXAMPLE 6

A mixture of 3.3 g. of 3,7-bistrifluoromethyl-5H-dibenz-[b,f]-azepine (prepared as in Example 5) and 0.4 g. of sodium amide in 100 ml. of toluene is heated at reflux for two hours. A solution of 1.3 g. of 3-chloro-1-dimethylaminopropane in 25 ml. of toluene is added and the resulting mixture is refluxed for 18 hours, with stirring. The reaction mixture is worked up as in Example 2 to yield 5-(3'-dimethylaminopropyl)-3,7-bistrifluoromethyl-5H-dibenz-[b,f]-azepine.

Treating an ethyl acetate solution of the free base with an equimolar solution of maleic acid in ethyl acetate gives the maleate salt.

EXAMPLE 7

A solution of 27.2 g. of 2-nitro-4-ethoxytoluene (prepared from 2-nitro-4-hydroxytoluene by alkylation of the potassium salt with ethyl iodide according to standard procedures) and 17.6 g. of amyl nitrite in 100 ml. of cyclohexane is added slowly to a stirred suspension of 10.2 g. of sodium ethoxide in 50 ml. of absolute ether maintained at 0 to 5° C. The resulting mixture is stirred for 18 hours at room temperature and then treated as described in Example 4 to give 2,2-dinitro-4,4'-diethoxydibenzyl.

A mixture of 18.0 g. of 2,2'-dinitro-4,4'-diethoxydibenzyl dissolved in 100 ml. of ethanol and 1.0 g. of Adams catalyst is hydrogenated at 40 to 50° C. and three atmospheres pressure for six hours. The reaction mixture is then heated on a steam bath, the catalyst filtered and 21.6 g. of phosphoric acid added to the solution to precipitate the diphosphate of 2,2'-diamino-4,4'-diethoxydibenzyl.

A mixture of 5.0 g. of 2,2'-diamino-4,4'-diethoxydibenzyl diphosphate in 50 ml. of diphenyl ether is heated for 40 minutes at 280 to 290° C. The cyclized product is isolated as outlined in Example 4 to give 3,7-diethoxyiminodibenzyl.

EXAMPLE 8

A glass column packed with 1.5 g. of 20% palladium on charcoal sprinkled on glass wool is heated and 7.5 g. of 3,7-diethoxyiminodibenzyl (prepared as in Example 7) is sublimed through the column by heating at 0.2 mm. until sublimation occurs. After five hours, the material collected at the cooled upper part of the column is removed, and purified as described in Example 1 to give the product, 3,7-diethoxy-5H-dibenz[b,f]azepine.

The 3,7-dimethoxy analogue is prepared in an analogous reaction starting with 3,7-dimethoxy iminodibenzyl.

EXAMPLE 9

A suspension of 8.4 g. of 3,7-diethoxy-5H-dibenz-[b,f]-azepine (prepared as in Example 8), 1.3 g. of sodamide and 6.9 g. of 6-bromo-1-dimethylaminohexane in 100 ml. of dry xylene is heated at reflux for 40 hours. Treating the reaction mixture as in Example 2 gives 3,7-diethoxy-5 - (6'-dimethylaminohexyl) - 5H - dibenz - [b,f]-azepine, which may be molecularly distilled at 200° C. and 5 microns.

EXAMPLE 10

A solution of 26.9 g. of 4-isopropyl-2-nitrotoluene and 17.6 g. of amyl nitrite in 100 ml. of cyclohexane is added dropwise to a stirred suspension of 10.2 g. of sodium ethoxide in 50 ml. of absolute ether at 5° C. The mixture is stirred at room temperature for 18 hours and treated as described in Example 4 to yield the product, 2,2-dinitro-4,4'-diisopropyldibenzyl.

Following the general procedure outlined in Example 4, 2,2'-dinitro-4,4'-diisopropyldibenzyl is reduced with Raney nickel in dioxane solution and the resulting diamino compound is treated with phosphoric acid to give the diphosphate salt.

A mixture of 49.2 g. of 2,2'-diamino-4,4'-diisopropyldibenzyl diphosphate and 150.0 g. of polyphosphoric acid is heated at 280–300° C. for 40 minutes. The cooled reaction mixture is poured onto ice and extracted with ether. The extracts are washed with dilute hydrochloric acid and water; then dried and evaporated to yield 3,7-diisopropyliminodibenzyl.

EXAMPLE 11

A suspension of 2.8 g. of 3,7-diisopropyliminodibenzyl (prepared as in Example 10), 0.6 g. of potassium amide and 1.3 g. of 2-chloro-1-dimethylaminopropane in 75 ml. of toluene is stirred and refluxed for 15 hours. The cooled reaction mixture is treated with water and extracted with dilute hydrochloric acid. The acid extracts are neutralized with ammonium hydroxide, extracted with benzene and the solvent evaporated in vacuo. The residue, which is a mixture of the two isomeric isopropyl compounds, is purified to give 3,7-diisopropyl-5-dimethylaminoisopropyliminodibenzyl.

EXAMPLE 12

A glass column packed with 1.5 g. of 30% palladium on charcoal sprinkled on glass wool is electrically heated and 5.0 g. of 3,7-diisopropyl-5-dimethylaminoisopropyl-iminodibenzyl (prepared as in Example 11) is distilled through by heating at 0.1 mm. until distillation occurs. The upper part of the column is cooled and after four hours the material which collected is removed. The crude product is purified by chromatography through alumina using benzene and chloroform to yield 3,7-diisopropyl-5-dimethylaminoisopropyl-5H-dibenz-[b,f]-azepine.

A solution of the free base in ethyl acetate treated with bismethylenesalicyclic acid in ethanol solution gives the bismethylenesalicylate salt.

EXAMPLE 13

A glass column packed with 0.5 g. of 30% palladium on charcoal sprinkled on glass wool is electrically heated and 2.5 g. of 3,7-dimethyliminodibenzyl (Belgian Patent No. 541,489) is sublimed through by heating at 0.5 mm. until sublimation occurs. The uper part of the column is cooled in a Dry Ice bath. After two hours the reaction is completed and the material which collected is removed. Purification of the crude product by a chromatographic procedure using alumina yields 3,7-dimethyl-5H-dibenz-[b,f]-azepine as yellow crystals.

EXAMPLE 14

A suspension of 11.0 g. of 3,7-dimethyl-5H-dibenz-[b,f]-azepine (prepared as in Example 13) and 2.2 g. of sodamide in 150 ml. of xylene is heated at reflux for one hour with stirring. A solution of 9.7 g. of 1-(3'-chloropropyl)-4-methylpiperazine in 50 ml. of xylene is added and the mixture refluxed for six hours. The reaction mixture is cooled and worked up as described in Example 3 to yield 3,7-dimethyl-5-[3'-(4''-methyl-1''-piperazinyl)-propyl]-5H-dibenz-[b,f]-azepine as yellow crystals.

By treating a solution of the free base with hydrogen chloride gas the dihydrochloride salt is obtained.

EXAMPLE 15

A glass column packed with 2.2 g. of 30% palladium on charcoal sprinkled on glass wool is heated and 10.0 g. of 3,7-dibromo-5-(2'-N-pyrrolidinylethyl-iminodibenzyl (Australian patent application No. 11,918) is distilled through by heating at 0.01 mm. until distillation occurs. The collected material is removed from the cooled upper part of the column after several hours and purified as described in Example 1 to give 3,7-dibromo-5-(2'-N-pyrrolidinylethyl)-5H-dibenz-[b,f]-azepine as a thick yellow oil.

A solution of the free base in ether treated with glacial acetic acid yields the acetate salt.

EXAMPLE 16

Following the general procedure outlined in Example 1, 2.5 g. of 3,7-dichloroiminodibenzyl (Belgian Patent No. 541,489) is sublimed through a glass column packed with 0.5 g. of 30% palladium on charcoal sprinkled on glass wool. After two hours, the collected material from the cooled part of the column is removed and purified to give 3,7-dichloro-5H-dibenz-[b,f]-azepine as yellow crystals.

Similarly, dehyrogenation of 3,7-dibromoiminodibenzyl with 30% palladium on charcoal yields 3,7-dibromo-5H-dibenz-[b,f]-azepine.

EXAMPLE 17

A stirred suspension of 10.4 g. of 3.7-dichloro-5H-dibenz-[b,f]-azepine (prepared as in Example 16) and 1.7 g. of sodium amide in 150 ml. of xylene is refluxed for one hour. A solution of 7.7 g. of 1-(3'-chloropropyl)-4-methylpiperazine in 50 ml. of xylene is added and the resulting mixture heated at reflux for six hours. The cooled reaction mixture is worked up as in Example 3 and the crude product dissolved in ether is treated with hydrogen chloride gas to give 3,7-dichloro-5-[3'-(4''-methyl-1''-piperazinyl)-propyl]-5H-dibenz-[b,f]-azepine dihydrochloride.

EXAMPLE 18

An electrically heated glass column is packed with 1.2 g. of 30% palladium on charcoal sprinkled on glass wool and 5.0 g. of 3,7-dichloro-5-(3'-dimethylaminopropyl)-iminodibenzyl (Australian patent application No. 11,918) is distilled through the column by heating at 0.01 mm. until distillation occurs. The product is isolated and purified as described in Example 1 to give 3,7-dichloro-5-(3'-dimethylaminopropyl)-5H-dibenz-[b,f]-azepine.

Be reacting an ethyl acetate solution of the free base with maleic acid the yellow maleate salt is isolated.

EXAMPLE 19

A stirred suspension of 4.8 g. of 5H-dibenz-[b,f]-azepine (prepared as in Example 1) and 1.1 g. of sodamide in 125 ml. of xylene is refluxed for 40 minutes. A solution of 5.2 g. of 1-formyl-4-(3'-chloropropyl)-piperazine in 25 ml. of xylene is added and the mixture is refluxed for 16 hours. The reaction mixture is treated with about 50 ml. of water and the separated organic layer extracted with dilute hydrochloric acid. The acidic extracts are made basic with ammonium hydroxide and further extracted with benzene. Distillation of the solvent in vacuo gives the residual product, 5-[3'-(N-formylpiperazinyl)-propyl]-5H-dibenz-[b,f]-azepine.

EXAMPLE 20

A solution of 41.8 g. of 5-[3'-(N-formylpiperazinyl)-propyl]-5H-dibenz-[b,f]-azepine (prepared as in Example 19) in 200 ml. of ethanol and 109 ml. of water containing 13 ml. of 40% sodium hydroxide solution is heated at reflux for two hours. The ethanol is removed by distillation in vacuo on the steam bath and the residue is treated with benzene and water. The dried benzene layer is evaporated in vacuo and the residue vacuum distilled to give 5-(3'piperazinylpropyl)-5H-dibenz-[b,f]-azepine.

EXAMPLE 21

One equivalent of ethylene oxide is added to a solution of 3.2 g. of 5-(3'-piperazinylpropyl)-5H-dibenz-[b,f]-azepine (prepared as in Example 20) in 25 ml. of methanol and the mixture heated at reflux for one and one-half hours. The solvent is removed in vacuo to give the residual 5-[3'-(N-hydroxyethylpiperazinyl)-propyl-5H-dibenz-[b,f]-azepine, which is dissolved in 50 ml. of benzene and treated with a solution of 1.5 g. of acetyl chloride in 15 ml. of benzene. The resulting mixture is refluxed for 20 minutes, cooled and all solvents removed in vacuo to give the residual 5-[3'-N-acetoxyethylpiperazinyl)-propyl-5H-dibenz-[b,f]-azepine monohydrochloride. This salt is dissolved in alcohol and reacted with isopropanolic hydrogen chloride to yield the dihydrochloride.

Similarly, a portion of the residual hydroxyethyl compound prepared as above is treated in a benzene solution with isocaproyl chloride to yield 5-[3'-(N-isocaproyloxyethylpiperazinyl)-propyl]-5H-dibenz-[b,f]-azepine dihydrochloride.

EXAMPLE 22

A solution of 4.7 g. of 3,7-dichloro-5-(3'-hydroxypropyl-5H-dibenz-[b,f]-azepine p-toluenesulfonate (prepared from the reaction of the sodio derivative of 3,7-dichloro-5H-dibenz-[b,f]-azepine prepared as in Example 16, with γ-bromopropyl teterahydropyranyl ether in xylene, removing the pyranyl group by careful hydrolysis with hydrochloride acid and acylating the γ-hydroxy compound with excess p-toluenesulfonyl chloride in pyridine) and 1.5 g.

of butylamine in 30 ml. of ethanol is heated at reflux for ten hours. The solvent is removed from the reaction mixture and the residue is extracted with a water-chloroform mixture. The chloroform layer is extracted with dilute mineral acid and the extracts are neutralized with sodium carbonate solution. The crude product is extracted into ethyl acetate and the solution is heated with maleic acid to yield 3,7-dichloro-5-(3'-butylaminopropyl)-5H-dibenz-[b,f]-azepine maleate.

Following the above procedure and using an excess of methylamine or ethylamine in a sealed tube, 3,7-dichloro-5-(3'-methylaminopropyl)-5H - dibenz - [b,f]-azepine and 3,7 - dichloro-5-(3'-ethylaminopropyl)-5H-dibenz-[b,f]-azepine are obtained, respectively.

EXAMPLE 23

A mixture of 7.3 g. of 3,7-dimethyl-5H-dibenz-[b,f]-azepine (prepared as in Example 13), 1.4 g. of sodamide and 7.9 g. of N-ω-chlorohexyl-N'-methylpiperazine in 125 ml. of xylene is stirred and refluxed for 50 hours. Working up the reaction mixture as described in Example 3, 3,7-dimethyl-5-[6' - (N-methylpiperazinyl) - hexyl]-5H-dibenz-[b,f]-azepine is isolated.

Treating an ethereal solution of the free base with anhydrous hydrogen bromide gas yields the dihydrobromide salt.

EXAMPLE 24

A suspension of 6.4 g. of 5-(3'-piperazinylpropyl)-5H-dibenz-[b,f]-azepine (prepared as in Example 20), 4.2 g. of 2-bromo-2'-hydroxyethyl ether and 4.1 g. of potassium carbonate in 125 ml. of toluene is refluxed for eight hours. The reaction mixture is treated with water and the separated organic layer extracted with dilute acid. The acidic extracts are made basic and further extracted. Evaporation of the extract yields crude 5-[3'-(N-hydroxyethoxyethylpiperazinyl)-propyl]-5H-dibenz-[b,f]-azepine, which may be purified by chromatography through alumina.

EXAMPLE 25

A solution of 2.0 g. of 5-[3'-(N-hydroxyethoxyethylpiperazinyl)-propyl]-5H-dibenz-[b,f] - azepine (prepared as in Example 24) in 50 ml. of dry benzene is treated with 0.8 g. of acetyl chloride. The reaction mixture is stirred at room temperature for three hours and then poured into water, neutralized and extracted with benzene. The solvent is evaporated and on alcoholic solution of the residue reacted with anhydrous hydrogen chloride gas to give 5-[3'-(N-acetoxyethoxyethylpiperazinyl)-propyl]-5H-dibenz-[b,f]-azepine dihydrochloride.

Similarly, by acylating with butyryl chloride, 5-[3'-(N-butyryloxyethoxyethylpiperazinyl)-propyl] - 5H - dibenz-[b,f]-azepine dihydrochloride is obtained.

EXAMPLE 26

A suspension of 17.6 g. of 5-(3'-piperazinylpropyl)-5H-dibenz-[b,f]-azepine (prepared as in Example 20), 2.4 g. of sodamide and 9.2 g. of 2-bromo-1-dimethyl-aminoethane in 250 ml. of benzene is stirred and refluxed for six hours. Upon treating the reaction mixture as described in Example 3, 5-[3'-(N-dimethylaminoethylpiperazinyl)-propyl]-5H-dibenz-[b,f]-azepine is obtained.

Following the same procedure as above and alkylating with 4-bromo-1-diethylaminobutane, 5-[3'-(N-diethylaminobutylpiperazinyl)-propyl]-5H-dibenz-[b,f] - azepine is prepared.

EXAMPLE 27

A glass column packed with 1.2 g. of 20% palladium on charcoal sprinkled on glass wool is heated and 5.0 g. of 5-(2'-diethylaminoethyl)-iminodibenzyl (U.S. Patent 2,554,736) is distilled through the column by heating at 0.01 mm. until distillation occurs. Isalating the collected material from the cooled part of the column and purifying as described in Example 1, 5-(2'-diethylaminoethyl)-5H-dibenz-[b,f]-azepine is obtained.

EXAMPLE 28

A suspension of 16.4 g. of 3,7-bistrifluoromethyl-5H-dibenz-[b,f]-azepine (prepared as in Example 5), 2.1 g. of sodamide and 13.6 g. of N-carbethoxy-N'-(α-chloro-β-methylpropyl)-piperazine (prepared by reacting N-carbethoxypiperazine with 3-bromo-2-methylpropyl chloride) in 200 ml. of toluene is heated at reflux for 17 hours. Working up the reaction mixture as described in Example 19 yields 5-[3'-(N-carbethoxypiperazinyl)-2'-methylpropyl]-3,7-bistrifluoromethyl - 5H - dibenz-[b,f]-azepine.

A solution of 8.1 g. of the carbethoxy compound prepared above in 75 ml. of aqueous ethanol and 2.5 ml. of 40% sodium hydroxide solution is refluxed for four hours. The solvent is evaporated in vacuo and the residue treated with benzene-water. Evaporation of the extract yields 3,7-bistrifluoromethyl-5-(2'-methyl-3'-piperazinylpropyl)-5H-dibenz-[b,f]-azepine.

Treating a solution of the free base in ethyl acetate with an ethanolic solution of mandelic acid furnishes the dimandelate salt.

EXAMPLE 29

To a solution of 4.7 g. of 3,7-bistrifluoromethyl-5-(2'-methyl-3'-piperazinylpropyl)-5H-dibenz - [b,f] - azepine (prepared as in Example 28) in 25 ml. of ethanol, one equivalent of a ethylene oxide is added and the mixture is refluxed for one and one-half hours. The solvent is removed and a solution of the residue in 100 ml. of benzene is treated with a solution of 1.6 g. of acetyl chloride in 20 ml. of benzene. The resulting mixture is refluxed for 30 minutes and then worked up as in Example 21 to yield 3,7-bistrifluoromethyl-5-[2'-methyl-3'-(N-acetoxyethylpiperazinyl)-propyl]-5H-dibenz - [b,f] - azepine dihydrochloride.

Similarly, by reacting the 3,7-bistrifluoromethyl-5-[2'-methyl-3'-(N-hydroxyethylpiperazinyl)-propyl] - 5H - dibenz-[b,f]-azepine obtained as above with benzoyl chloride in benzene solution, 3,7-bistrifluoromethyl-5-[2'-methyl-3'-(N-benzoyloxyethylpiperazinyl)-propyl] - 5H-dibenz-[b,f]-azepine dihydrochloride is obtained.

EXAMPLE 30

A solution of 1.5 g. of lithium aluminum hydride in 100 ml. of anhydrous ether is added dropwise to a stirred suspension of 3.3 g. of 5-(2'-cyanoethyl)-3,7-diethoxy-5H-dibenz-[b,f]-azepine (prepared by reacting 3,7-diethoxy-5H-dibenz-[b,f]-azepine, obtained as described in Example 8, with acrylonitrile in the presence of benzyltrimethylammonium hydroxide) in 250 ml. of anhydrous ether, and the mixture is refluxed for 24 hours. The cooled reaction mixture is treated with methanol to destroy the metal complex and filtered. The filtrate is evaporated and the residue extracted with dilute mineral acid. The acid extracts are neutralized, extracted with chloroform and upon distillation of the solvent in vacuo, 5-(3'-aminopropyl)-3,7-diethoxy-5H-dibenz - [b,f] - azepine is isolated.

EXAMPLE 31

A suspension of 14.0 g. of 3,7-bistrifluoromethyl-5-(2'-methyl-3'-piperazinylpropyl) - 5H - dibenz-[b,f]-azepine (prepared as in Example 28), 5.7 g. of 3-bromopropanol and 6.2 g. of potassium carbonate in 200 ml. of xylene is stirred and refluxed for five hours. Working up the reaction mixture as described in Example 24 yields 3,7-bistrifluoromethyl - 5-[2'-methyl-3'-(N-3-hydroxypropylpiperazinyl)-propyl]-5H-dibenz-[b,f]-azepine.

A solution of 5.4 g. of the free base and 2.1 g. of butyryl chloride in 100 ml. of benzene is allowed to stand at room temperature for 17 hours and then worked up as in Example 25 to give 3,7-bistrifluoromethyl-5-[2'-methyl-3'-(N-3 - butyryloxypropylpiperazinyl) - propyl]-5H-dibenz-[b,f]-azepine dihydrochloride.

EXAMPLE 32

A mixture of 4.2 g. of 2-nitro-4-methoxytoluene, 3.4 g. of 2-nitrotoluene and 5.9 g. of amyl nitrite is dissolved in 40 ml. of cyclohexane and the solution added dropwise to a suspension of 3.4 g. of sodium ethoxide in 25 ml. of absolute ether at 5° C., with stirring. The reaction mixture is then stirred at room temperature for 15 hours. Upon working up as described in Example 4, 2,2'-dinitro-4-methoxy dibenzyl is obtained by fractional crystallization of the products from alcohol.

A solution of 7.6 g. of 2,2'-dinitro-4-methoxydibenzyl in 50 ml. of dioxane is hydrogenated as described in Example 4 with 2.5 g. of Raney nickel catalyst. The dioxane solution containing the product is similarly treated with 10.8 g. of phosphoric acid to yield the diphosphate of 2,2'-diamino-4-methoxydibenzyl.

13.1 g. of 2,2'-diamino-4-methoxydibenzyl diphosphate is heated alone at 280° C. for 40 minutes. The cooled solid is washed with dilute hydrochloric acid and water to yield 3-methoxyiminodibenzyl.

EXAMPLE 33

As described in Example 1, 5.0 g. of 3-methoxyiminodibenzyl (prepared as in Example 32) is sublimed, by heating at 0.5 mm., through a heated glass column packed with 1.0 g. of 30% palladium on charcoal sprinkled on glass wool, and the material which collects in the cooled part of the column is purified to give 3-methoxy-5H-dibenz-[b,f]-azepine.

EXAMPLE 34

A stirred suspension of 3.1 g. of 3-methoxy-5H-dibenz-[b,f]-azepine (prepared as in Example 33) and 0.7 g. of sodamide in 50 ml. of xylene is heated at reflux for one hour. A solution of 3.5 g. of 1-dimethylamino-2,2-dimethyl-3-bromopropane in 30 ml. of xylene is added slowly and the resulting mixture is refluxed for 30 hours. By the method used in Example 2, 5-(2',2'-dimethyl-3'-dimethylaminopropyl) - 3-methoxy-5H-dibenz-[b,f]-azepine is obtained.

EXAMPLE 35

A suspension of 1.7 g. of 3-methoxy-5H-dibenz-[b,f]-azepine (prepared as in Example 33), 0.4 g. of sodamide and 2.4 g. of 3-chloro-1-(N-benzylpiperazinyl)-propane in 100 ml. of toluene is heated at reflux for 17 hours. Following the work-up procedure of Example 3, 5-[3'-(N-benzylpiperazinyl) - propyl] - 3-methoxy - 5H-dibenz-[b,f]-azepine is isolated.

Similarly by employing 3-chloro-1-(N-ω-phenylbutyl-piperazinyl)-propane, 3-methoxy-5-[3'-(N-ω-phenylbutyl-piperazinyl)-propyl]-5H-dibenz-[b,f]-azepine is obtained.

EXAMPLE 36

A stirred suspension of 9.4 g. of 3,7-bistrifluoromethyl-5-(2'-methyl-3'-piperazinylpropyl) - 5H-dibenz-[b,f]-azepine (prepared as in Example 28), 4.5 g. of n-hexyl iodide and 8.3 g. of potassium carbonate in 150 ml. of xylene is heated at reflux for eight hours. The reaction mixture is filtered and the filtrate washed with water, dried and concentrated. The residual product is dissolved in ethyl acetate and reacted with two equivalents of maleic acid to yield 3,7-bistrifluoromethyl-5-[2'-methyl-3'-(N-hexylpiperazinyl)-propyl]-5H-dibenz-[b,f]-azepine dimaleate.

EXAMPLE 37

A solution of 10.2 g. of 2-nitro-4-trifluoromethyl-toluene (prepared as described in Example 4), 6.8 g. of 2-nitrotoluene and 11.7 g. of amyl nitrite in 75 ml. of cyclohexane is slowly added to a stirred suspension of 6.8 g. of sodium ethoxide in 35 ml. of absolute ether at 5° C. The mixture is stirred at room temperature for 24 hours and then treated as in Example 4 to give 2,2'-dinitro-4-trifluoromethyldibenzyl.

A mixture of 3.4 g. of 2,2'-dinitro-4-trifluoromethyldibenzyl and 1.0 g. of Raney nickel in 50 ml. of dioxane is hydrogenated at 40 to 50° C. and four atmospheres pressure until the theoretical amount of hydrogen is taken up. After heating the reaction mixture on a steam bath to about 90–95° C., the catalyst is filtered and 5.4 g. of phosphoric acid is added to the hot filtrate to give 2,2'-diamino-4-trifluoromethyldibenzyl diphosphate.

4.8 g. of 2,2'-diamino-4-trifluoromethyldibenzyl diphosphate is heated alone at 280° C. for 40 minutes and the cooled solid washed with dilute hydrochloric acid and water to give 3-trifluoromethyliminodibenzyl.

EXAMPLE 38

A suspension of 5.3 g. of 3-trifluoromethyliminodibenzyl (prepared as in Example 37), 0.9 g. of sodamide and 3.0 g. of 1-chloro-3-dimethylamino-2-methylpropane in 150 ml. dry xylene is stirred and heated at reflux for 15 hours. After cooling, the reaction mixture is treated with water and the organic layer extracted with dilute hydrochloric acid. The acid extracts are neutralized and extracted with benzene. Removal of the solvent in vacuo gives 5 - (3'-dimethylamino-2'-methylpropyl)-3-trifluoromethyliminodibenzyl.

EXAMPLE 39

A glass column is packed with 1.5 g. of 25% palladium on charcoal sprinkled on glass wool. The column is electrically heated and 7.5 g. of 5-(3'-dimethylamino-2'-methylpropyl)-3-trifluoromethyliminodibenzyl (prepared as in Example 38) is distilled through the column by heating at 0.5 mm. until distillation occurs. The upper part of the column is cooled and after four hours the reaction is completed. The material which collected is removed and chromatographed through alumina to give 5-(3'-dimethylamino - 2' - methylpropyl)-3-trifluoromethyl-5H-dibenz-[b,f]-azepine.

A solution of the above free base in ether is treated with anhydrous hydrogen chloride gas to yield the hydrochloride salt.

EXAMPLE 40

A suspension of 3.8 g. of 5-(3'-piperazinylpropyl)-5H-dibenz-[b,f]-azepine (prepared as in Example 20), 3.4 g. of 4-bromo-4'-hydroxybutyl ether (prepared from 4,4'-dihydroxybutyl ether by careful treatment with one equivalent of hydrobromic acid) and 2.5 g. of potassium carbonate in 150 ml. of xylene is refluxed for 24 hours. Working up the reaction mixture as in Example 24, 5-[3'-(N-hydroxybutoxybutylpiperazinyl)-propyl] - 5H - dibenz-[b,f]-azepine is obtained.

A solution of 2.3 g. of the free base and 1.4 g. of benzoyl chloride in 50 ml. of dry benzene is allowed to stand at room temperature for 24 hours and then treated as described in Example 25 to yield 5-[3'-(N-benzoyloxybutoxybutylpiperazinyl)-propyl]-5H-dibenz-[b,f]-azepine dihydrochloride.

Similarly, acylating with acetyl chloride as above yields 5-[3'-(N-acetoxybutoxybutylpiperazinyl) - propyl] - 5H-dibenz-[b,f]-azepine dihydrochloride.

EXAMPLE 41

A suspension of 12.8 g. of 5-(3'-piperazinylpropyl)-5H-dibenz-[b,f]-azepine (prepared as in Example 20), 9.0 g. of ω-bromohexanol and 8.3 g. of potassium carbonate in 250 ml. of xylene is stirred and heated at reflux for 24 hours. The reaction mixture is worked up as described in Example 24 to yield 5-[3'-(N-ω-hydroxyhexylpiperazinyl)-propyl]-5H-dibenz-[b,f]-azepine.

A solution of 10.5 g. of the free base and 7.0 g. of benzoyl chloride in 150 ml. of benzene is allowed to stand at room temperature for 17 hours and then worked up as in Example 25 to give 5-[3'-(N-ω-benzoylhexylpiperazinyl)-propyl]-5H-dibenz-[b,f]-azepine dihydrochloride.

Similarly, acylating the above hydroxy compound with acetyl chloride in a benzene solution yields 5-[3'-(N-ω- acetoxyhexylpiperazinyl) - propyl] - 5H - dibenz - [b,f]-azepine dihydrochloride.

What is claimed is:
1. The method of making compounds having the following formula:

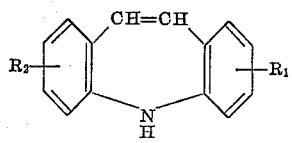

in which $R_1$ and $R_2$ are members selected from the group consisting of hydrogen, halogen of atomic weight less than 80, trifluoromethyl, alkyl having 1 to 6 carbon atoms and alkoxyl having 1 to 6 carbon atoms, which comprises heating an iminodibenzyl of the following formula:

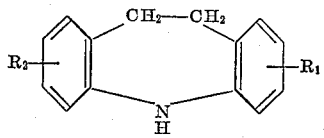

in the presence of a dehydrogenation catalyst selected from the group consisting of a sulfur, selenium, palladium, ruthenium, iridium, rhodium and osmium catalyst.

2. The method of claim 1 in which the catalyst is palladium-on-charcoal.

3. The method of claim 1 in which the iminodibenzyl is vaporized and then brought into contact with said dehydrogenation catalyst.

4. The method of claim 3 in which the iminodibenzyl in the vapor phase is passed through a glass column packed with said dehydrogenation catalyst.

5. The method of making compounds having the following formula:

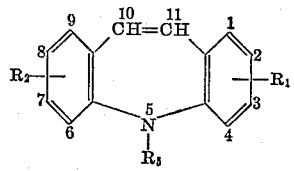

in which $R_1$ and $R_2$ are members selected from the group consisting of hydrogen, halogen, trifluoromethyl, alkyl and alkoxyl; $R_5$ is a member selected from the group consisting of aminoalkylene, monoalkylaminoalkylene, dialkylaminoalkylene, pyrrolidinylalkylene, N-hydrogenpiperazinylalkylene, N-alkylpiperazinylalkylene, N-hydroxyalkylenepiperazinylalkylene, N - alkanoyloxalkyylenepiperazinylalkylene, N-benzoyloxyalkylenepiperazinylalkylene, N-dialkylaminoalkylenepiperazinylalkylene, N - hydroxyalkyleneoxyalkylenepiperazinylalkylene, N-alkanoylalkyleneoxyalkylenepiperazinylalkylene, N - benzoyloxyalkyleneoxyalkylenepiperazinylalkylene and N-phenylalkylpiperazinylalkylene; each of said alkylene chains having 2 to 6 carbon atoms and separating the nitrogens to which it is attached by at least 2 carbon atoms; and each of the said alkyl, alkoxy and alkanoyl moieties having 1 to 6 carbon atoms; which comprises heating an iminodibenzyl of the following formula:

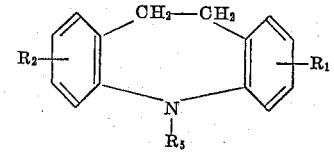

in the presence of a dehydrogenation catalyst selected from the group consisting of a sulfur, selenium, palladium, ruthenium, iridium, rhodium and osmium catalyst.

6. The method of claim 5 in which the catalyst is palladium-on-charcoal.

7. The method of claim 5 in which the iminodibenzyl is vaporized and then brought into contact with said dehydrogenation catalyst.

8. The method of claim 5 in which the iminodibenzyl in the vapor phase is passed through a glass column packed with said dehydrogenation catalyst.

References Cited in the file of this patent
UNITED STATES PATENTS
2,921,069 Ullyot _____ Jan. 12, 1960